United States Patent [19]

Ebbinghaus

[11] Patent Number: 5,403,049
[45] Date of Patent: Apr. 4, 1995

[54] IMPACT ABSORBER

[75] Inventor: Alfred Ebbinghaus, Aalen, Germany

[73] Assignee: Cosma International, Inc., Markham, Canada

[21] Appl. No.: 988,957

[22] PCT Filed: Jul. 17, 1991

[86] PCT No.: PCT/DE91/00584

§ 371 Date: Feb. 26, 1993

§ 102(e) Date: Feb. 26, 1993

[87] PCT Pub. No.: WO92/01588

PCT Pub. Date: Feb. 6, 1992

[30] Foreign Application Priority Data

Jul. 17, 1990 [DE] Germany ............ 40 22 734.0
Sep. 5, 1990 [DE] Germany ............ 40 28 164.7

[51] Int. Cl.$^6$ .................... B60R 27/00; F16F 7/12
[52] U.S. Cl. ........................ 293/133; 293/122; 188/377
[58] Field of Search ............ 293/133, 120, 121, 122, 293/132; 188/371, 374, 377; 296/189

[56] References Cited

U.S. PATENT DOCUMENTS

| 3,538,785 | 11/1970 | Grancon | 74/492 |
|---|---|---|---|
| 3,899,047 | 8/1975 | Maeda et al. | 188/1 C |
| 4,181,198 | 1/1980 | Lindberg | 188/1 C |
| 4,531,619 | 7/1985 | Eckels | 188/371 |
| 4,995,486 | 2/1991 | Garneweidner | 293/133 X |
| 5,090,755 | 2/1992 | Garnweidner | 293/133 |
| 5,174,421 | 12/1992 | Rink et al. | 293/133 X |

FOREIGN PATENT DOCUMENTS 1811453 6/1970 Germany.
3042931C2 8/1986 Germany.
3836724A1 5/1990 Germany.

Primary Examiner—Joseph Pape
Attorney, Agent, or Firm—Cushman, Darby & Cushman

[57] ABSTRACT

The invention concerns an impact-absorption device, particularly for vehicles, which is attached on one side to the bumper and on the other side to the longitudinal girder or another part of the vehicle-body structure. The device has a non-regenerative deforming unit designed to absorb energy when acted on by a force with a component in the direction of the longitudinal axis of the longitudinal girder. The deforming unit has at least two hollow deforming elements which engage one inside the other, one of which being attached to the bumper while the other is attached to the longitudinal girder of the vehicle. If the device is crushed by a force component acting along its longitudinal axis, the deforming elements are telescoped into each other, deforming the material. The hollow deforming elements (12, 14) have a non-circular, preferably oval or angular, cross-section. In a particularly preferred embodiment, the hollow elements have ribs.

7 Claims, 2 Drawing Sheets

IMPACT ABSORBER

FIELD OF THE INVENTION

The invention concerns an impact absorber, especially for motor vehicles, which is attached to the bumper on one side and to the longitudinal runner of the vehicle chassis on the other side, with a non-regenerable deformation member to absorb kinetic energy if compressive forces are applied in the direction of the longitudinal axis of the longitudinal runner.

BACKGROUND

Generic impact absorbers are known from DE-OS 38 36 724, EIPPER et al., and also from DE-OS 30 42 931, URSPRUNG et al., for example. These known impact absorbers are disadvantageous because they are complicated to manufacture and are therefore relatively expensive.

Furthermore, impact absorbers consisting of pipe-shaped parts which slide into each other under deformation, with essentially circular cross-sections are known from U.S. Pat. No. 3,899,047, MAEDA, and DE-PS 28 25 460, LINDBERG, and corresponding U.S. Pat. No. 4,181,198.

These known impact absorbers worked well in case of pure head-on collisions, but were not equipped to accept crosswise forces in a satisfactory manner in case of offset head-on collisions which occur far more frequently in practice.

SUMMARY OF THE INVENTION

As a consequence, it is the purpose of the invention to provide an effective impact absorber which is also more effective in case of forces occurring at an angle, compared to the known impact absorbers.

The problem is solved in accordance with the invention with a generic impact absorber, in which the hollow deformation pieces have a non-round, preferably oval or rectangular cross-section.

It is most often expected of impact absorbers, that they accept forces which occur essentially in a plane, so that an oval shape is adequate in most cases. For specially positioned cases, other non-round shapes can also be formed however.

It can thereby be in the interest of saving materials and weight if both of the hollow parts have lengthwise ribs shaped as reinforcement profiles to act as reinforcements, which can significantly improve the mechanical stability of the impact absorbers with the same weight. This form of implementation can be manufactured especially with the internal high pressure moulding process, as it is described in the following, for example.

It can be preferable to provide at least one intermediate layer between the outer deformation piece and the inner deformation piece, which can be deformed elastically or inelastically.

Depending on the required characteristics of the impact absorber, it is possible to shape the fixture in such a way that elastic deformation takes place up to a predetermined impulse in the longitudinal direction, while irreversible deformation takes place with higher impulses.

With certain forms of implementation, it can also be worthwhile however to provide inelastically deformable areas.

In addition to the close fit of the hollow moulded parts shaped mutually inside each other, it can be provided that the inner and outer layers are connected to each other through means of connection, such as weld points, rivets, pins or adhesive. Through such means of attachment, it is possible to vary the response characteristic of the absorber further, as is well-known to experts.

Preferably, the deformation piece has a deformation cone or crumple zone whose angle alpha is self-restraining for the displacement of the outer and inner parts relative to each other.

In general, it is to be established that pipes which are partially located inside each other are used as the starting materials for the manufacture of the impact absorber. "Pipe" is to be understood here as a hollow body which has a small inside diameter compared with its length and this expression is not restricted in any way to hollow bodies with circular cross-sections, but also includes rectangular pipes, hexagonal pipes and other hollow bodies with non-circular cross-sections, whose lengthwise dimension is larger than their diameter.

A seamless pipe is preferred as the starting pipe. Seamless pipe is to be understood here as pipe which does not exhibit a weld seam in the usual meaning.

Preferably, the starting pipes for the impact absorber in accordance with the invention—whereby the intermediate layer can also be manufactured from a pipe-shaped starting piece or can already be applied as the outside layer on the starting inner pipe or as the inside layer on the starting outer pipe—consist of multiple metal pipes arranged inside each other, but not necessarily overlapping each other exactly, whereby the metal of the metal pipes can be the same or different and the material for the intermediate layer can also be non-metallic. After implementation of the process, meaning after the application of internal pressure on the different pipe layers, they are pressed onto one another and fitted onto each other tightly and run essentially parallel to each other through close fit and friction fit, possibly also with shaped ribs. At the same time, other materials such as rubber and plastics, for example, can also be moulded with the metal, provided that they are suitable for the moulding process and metal pipes should also be understood here as pipes which consist only partly of metal and can also exhibit one or more other materials in layers. For example, suitable metals are carbon steels and alloyed steels, high temperature steels, annealing steels, unalloyed and alloyed, high temperature steels and stainless steels; furthermore, aluminum, aluminum alloys; titanium and titanium alloys, copper and its alloys as well as nickel and similar materials, whereby it is preferable that the materials guarantee an extensive contour-true filling of the tool mould. A low yield stress, a high deformability and a suitable strength after the moulding process are required in many cases with steel materials.

In one particular preferred process for the manufacture of an impact absorber in accordance with the invention, a multi-walled deformation piece is manufactured through an internal high pressure moulding process in which a fluid medium is introduced into an essentially pipe-shaped, multi-walled starting material under high pressure and thereby shapes the starting material against an outer mould. This process makes possible rapid and problem-free manufacture of deformation pieces adapted to each other, which are already located in their final installation position, through which complicated steps to insert the individual pieces within each other and also high requirements on the exact fit of the inner and outer parts can be avoided or fulfilled with no problems through the process.

The internal high pressure moulding process used here is described for example in "Industrieanzeiger" No. 20 of 9 Mar. 1984 and also in "Metallumformtechnik", Issue 1D/91, P. 15 ff: A. Ebbinghaus: "Precision Workpieces in Light Construction, Manufactured Through Internal High Pressure Mouldings", and also "Werkstatt und Betrieb" 123 (1990), 3, P. 241–243: A. Ebbinghaus: "Economic Construction with Internal High Pressure Moulded Precision Workpieces" and also "Werkstatt und Betrieb" 122 (19910), 11 (1989), P. 933–938. Reference is made here to these publications to avoid repetition in the full extent.

It is preferable thereby to use an internal high pressure moulding process in which the fluid material is a material on a water basis under a pressure up to 10,000 bar.

Preferably at least the inner and the outer parts are made of metal, preferably steel.

It can be provided that the elastic intermediate layer consists of a rubber-elastic material, such as a polymer, silicon rubber or rubber.

A suitable material for an intermediate layer in a form of execution with an inelastic intermediate layer is soft metal or plastic, for example.

In case of a design of the impact absorber with multiple pieces, especially one with more than two parts, each layer can each be manufactured from the material most suitable for it, whereby the inner and the outer materials must fulfill the requirements of a mechanically resistant, partially elastic material, while the material for the intermediate layer can serve to absorb energy and can be deformable either elastically or inelastically— depending on the desired damping behaviour.

DRAWINGS

DETAILED DESCRIPTION

Figure 1:
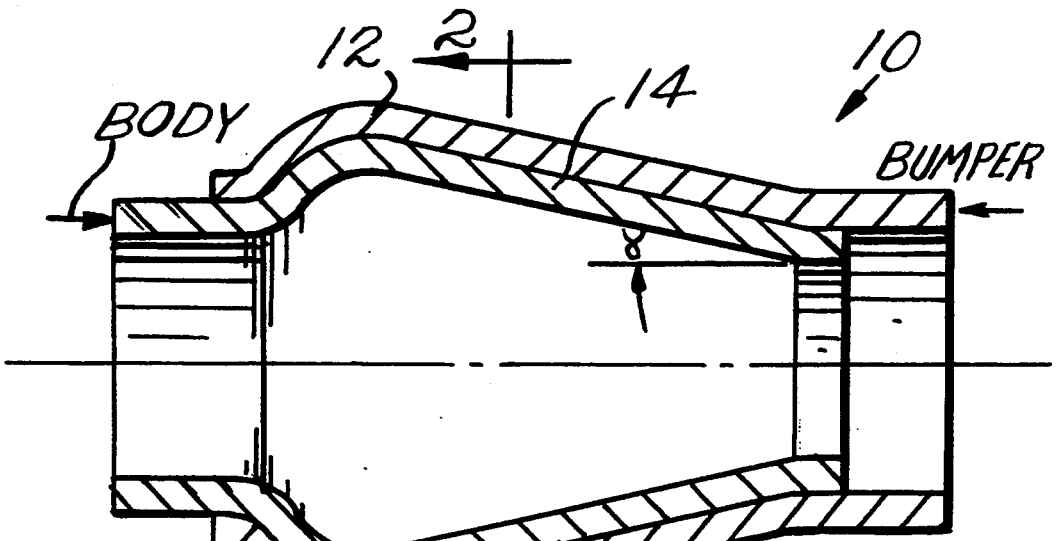
FIG. 1 Shows a schematic representation of an impact absorber in accordance with the invention, FIG. 2 Shows a cross-section along Line 2—2 of the impact absorber in FIG. 1, FIG. 3 Shows a further impact absorber with shaped reinforcing ribs, FIG. 4 Shows a cross-section through the impact absorber in FIG. 3 along Line 4—4.

As shown in FIG. 1, an impact absorber 10 in accordance with the invention exhibits a combination of hollow parts consisting of two hollow parts partially inserted into each other, an inner deformation piece 14 and an outer deformation piece 12. Both parts are shaped conically in their mutual overlapping area to the outside in bulging form under a self-restraining angle alpha which prevents the two pieces from separating from each other in case of pressure or tension below a predetermined force. Preferably both parts are made of steel and are preferably manufactured through the well-known internal high pressure moulding process, preferably from starting pipe pieces inserted into each other, through the application of pressure through a fluid medium from the inside of the pipe together against an outer mould, so that both parts are bonded onto each other through close fit and friction fit. In the form of implementation presented here, the inner part is attached to the body, preferably to a longitudinal runner of the chassis, while the outer part is connected to the bumper. When an impact occurs, such as head-on collision or an offset impact with a force component in the direction of the longitudinal axis of the vehicle, the inner and outer deformation parts (12, 14) are pushed against each other with the deformation of the bulge area to the outside and a widening of the angle alpha until the ability of the impact absorber to deform is exhausted and the deformation forces work further on the chassis and bumper, whereby the energy absorbed by the impact absorber can be adapted to meet the requirements through the selection of an appropriate profile in the overlapping area.

Figures 2, 4:
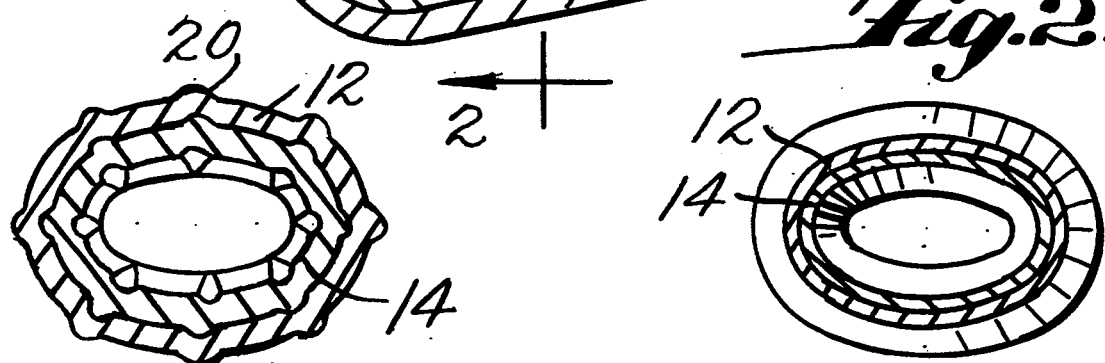
Figure 3:
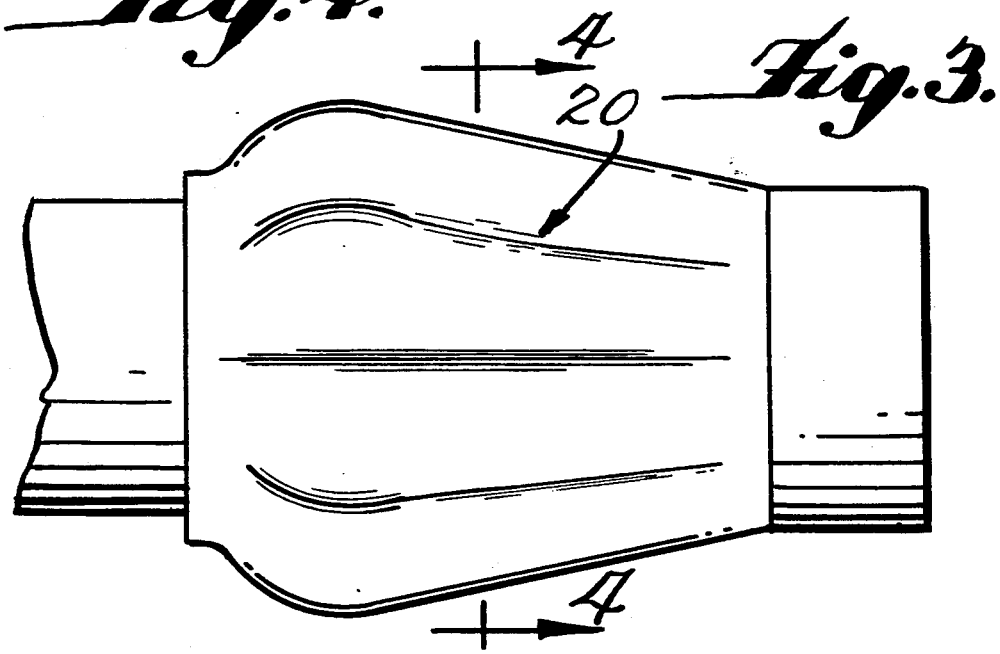

FIG. 2 shows a cross-section through the impact absorber in FIG. 1 along the Line 2—2, from which the oval-shaped cross-section can be seen. FIG. 3 presents a cross-section of a further form of implementation of an impact absorber 10 in accordance with the invention, which has lengthwise ribs.

In addition to the connection of the layers through the close fit and friction fit resulting from the shaping, a further connection between the layers can be established through weld points, adhesives, rivets or similar means in order to control the displacement of the parts relative to each other.

FIG. 3 contains a perspective view of an impact absorber 10, which is reinforced by shaped ribs in the lengthwise direction. This design makes it possible to lend the material an increased stiffness and resistance to pressure in the longitudinal direction of the impact absorber and thereby, in contrast to the form of implementation with uniformly thick walls, to use less material with the advantages of the corresponding material savings and weight reduction.

A cross-section along Line 4—4 in FIG. 3 is shown in FIG. 4, from which it can be clearly seen that the shaping of the impact absorber in accordance with the invention through the internal high pressure moulding process now produces a parallel wall shape in the inner and outer parts, so that the ribs 20 are formed in both parts.

Figure 5:
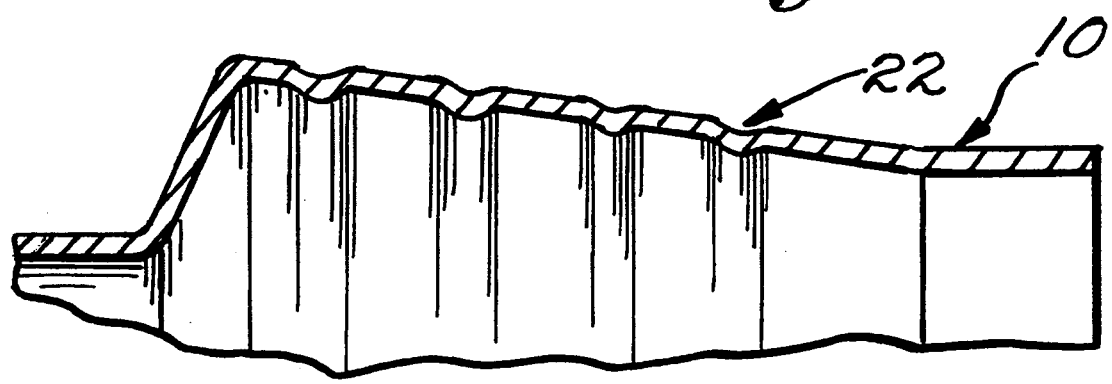
FIG. 5 Shows an impact absorber with shaped crosswise ribs, in a perspective view, FIG. 6 Shows a lengthwise section of the impact absorber of FIG. 5.

FIG. 5 contains a perspective view of a further form of implementation of the impact absorber with multiple cross ribs, which serve as intended crushpoints 22 and thereby facilitate deformation of the impact absorber at preferred locations, through which it is possible to control the behavior of this impact absorber in case of a head-on collision and further kinetic energy can be absorbed through deformation of the impact absorber, without transmitting the impact directly in the direction of the impact.

Figure 6:
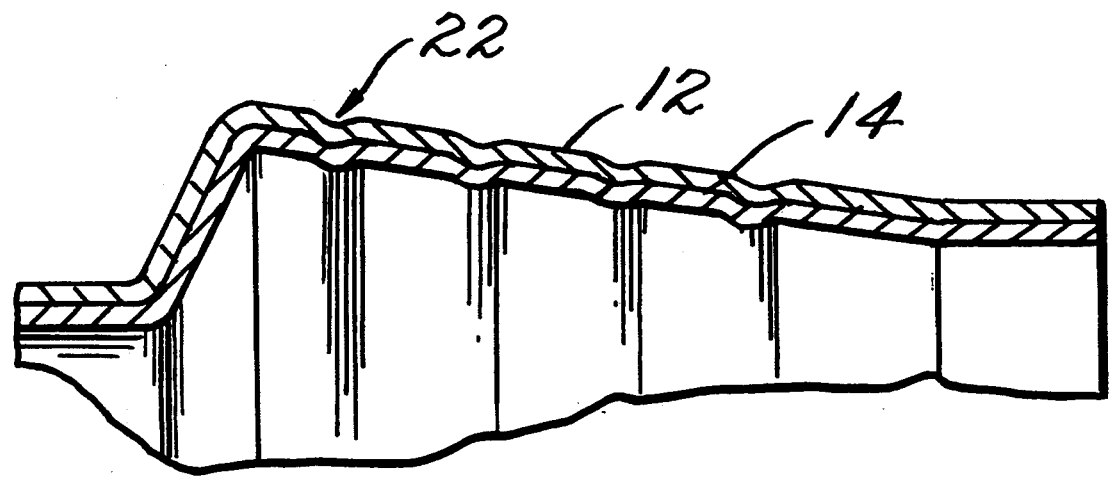

A cross-section of the impact absorber presented in FIG. 5 can be seen in FIG. 6, which shows that the inner and outer parts which form the impact absorber run parallel to each other, so that the intended deformation takes place in the area of the crosswise ribs in case of a force in the direction of the longitudinal axis.

What is claimed is:

1. Impact absorber for a motor vehicle having a chassis, including a lengthwise frame member, and a bumper;

said impact absorber interconnecting said bumper and said lengthwise frame member, and including a non-regenerable deformation member to absorb kinetic energy if forces are applied in the direction of a longitudinal axis of the lengthwise frame member, whereby the deformation member has at least two telescopically arranged hollow deformation pieces (12, 14), of which a first one is an outer deformation piece (12) and a second one is an inner deformation piece (14), of which one is attached to the bumper and the other is attached to the lengthwise frame member of the vehicle, whereby the deformation pieces (12, 14) are pushed together relative to each other with material deformation in case of crushing of the impact absorber with a force component along its longitudinal axis, and wherein the hollow deformation pieces (12, 14) have a non-circular cross-section in a vertical plane located between said bumper and said vehicle chassis.

2. Impact absorber in accordance with claim 1, wherein the hollow deformation pieces are both formed with lengthwise reinforcing ribs.

3. Impact absorber in accordance with claim 1, wherein the hollow deformation pieces each have at least one crosswise rib (22).

4. Impact absorber in accordance with claim 1, wherein at least one of the outer deformation piece (12) and the inner deformation piece (14) has a coating which prevents corrosion and influences how easily they slide with respect to each other.

5. Impact absorber in accordance with claim 1, wherein the hollow deformation pieces have a common longitudinal axis and taper with respect to said axis at an angle which is not greater than 30°.

6. Impact absorber in accordance with claim 1, wherein the hollow inner deformation member (14) defines hollow spaces which are filled with a compressible energy-absorbing medium.

7. Impact absorber in accordance with claim 1, wherein each deformation piece (10) is manufactured through an internal high-pressure molding process in which a fluid medium is introduced under high pressure into an essentially pipe-shaped multi-walled starting material and the starting material is shaped through pressure against an outer mold.

* * * * *